Dec. 30, 1958     O. AMIET     2,866,302

MACHINE FOR SHARPENING DRILLS

Filed June 12, 1956     5 Sheets-Sheet 1

Dec. 30, 1958     O. AMIET     2,866,302
MACHINE FOR SHARPENING DRILLS
Filed June 12, 1956     5 Sheets-Sheet 4

Dec. 30, 1958     O. AMIET     2,866,302
MACHINE FOR SHARPENING DRILLS Filed June 12, 1956     5 Sheets-Sheet 5

United States Patent Office 2,866,302
Patented Dec. 30, 1958

2,866,302

MACHINE FOR SHARPENING DRILLS

Oscar Amiet, Geneva, Switzerland, assignor to Christen & Co. A. G., a firm of Switzerland Application June 12, 1956, Serial No. 590,893

Claims priority, application Switzerland June 16, 1955

24 Claims. (Cl. 51—219)

My invention has for its object a machine for sharpening drills including on the one hand a grinding wheel and on the other hand a headstock incorporating a clamping member holding the drill.

In my improved machine, the drill being held slopingly with reference to the operative plane of the grinding wheel, is caused to rotate round its axis so as to grind its end into a conical shape while it recieves simultaneously a rocking movement round an axis located in the operative plane of the grinding wheel and passing through the apex of said conical surface so as to modify the angular opening of the latter and to provide thus the desired taper and the backing off the drill and finally the latter is reciprocated in a substantially axial direction so as to cut off the tip of the cone and to obtain thus the transverse edge forming the end of the drill shank, these different movements being performed simultaneously and synchronously.

My improved machine is characterized by the fact that the drill-holding clamp is fitted in a manner such that it is capable of rotating round an axis registering with that of the drill while the headstock is carried by the frame of the machine so as to be capable on the one hand to rock round an axis located in the operative plane of the grinding wheel and crossing the axis of the clamp and on the other hand to execute a reciprocating movement directed substantially along the axis of the clamp, the machine being characterized furthermore by a control mechanism synchronizing the rotation of the clamp with the movements of the headstock while means are provided for adjusting the amplitude of the movements of the headstock between zero and a maximum value and also for varying the amplitudes of the different movements with reference to one another.

I have illustrated by way of example in the accompanying drawings a preferred embodiment of my improved machine. In said drawings.

Figure 1:
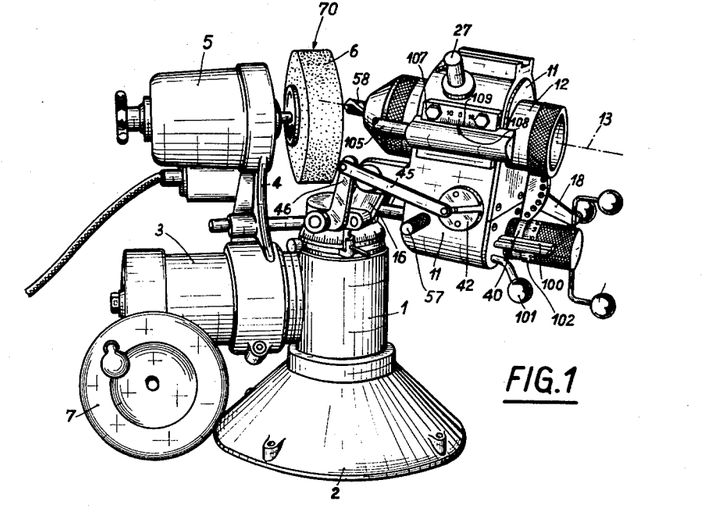
Figures 1 and 2 are two perspective views taken under different angles of the machine considered as a whole.

The machine illustrated includes a central frame 1—2 provided with a lateral cylindrical carrier 3 on which is revolubly fitted a support 4 for the motor 5 driving the grinding wheel 6. A control system which is not illustrated allows shifting through a hand/wheel 7 the support 4 of the grinding wheel by causing it to revolve round the carrier 3 the axis of which is parallel with that of the grinding wheel. A locking arrangement, which is similarly not illustrated, allows modifying through operation of a knurled head 8 (Fig. 2) the location of the grinding wheel along its axis so as to constrain its operative plane 9 to enter a position for which the central vertical axis 10 of the machine lies in said plane.

The machine includes furthermore a headstock 11 in which is revolubly mounted a clamping member 12 holding fast the drill to be sharpened. When said drill is positioned inside the clamp 12, its axis registers with the axis 13 of the latter, which axis 13 crosses the axis 10 of the machine. A feeler 14 (Fig. 16) the position of which is adjustable is mounted on the headstock 11 so as to provide for adjustment of the location of the drill in a manner such that its tip may lie exactly on the vertical axis 10 while its original slope with reference to the grinding wheel may be correctly defined. The headstock 11 is pivotally secured so as to rock round the axis of a spindle 15 perpendicular to the plane containing the axes 10 and 13, whereby said headstock may execute a rocking movement in said plane. The spindle 15 is mounted in the carrier 16 on a turret 2a revolubly fitted inside the frame 1 and adapted to revolve round the axis 10. The headstock 11 is thus adapted to rock round said vertical axis 10.

Figure 9:
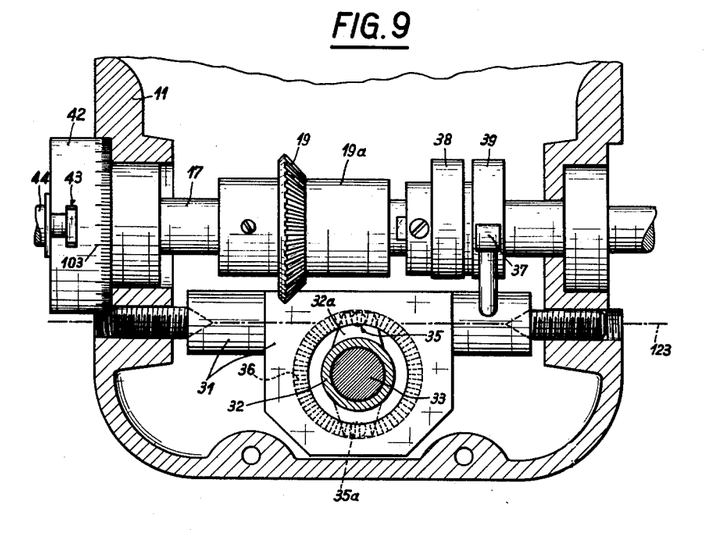
Fig. 9 is a cross-section through line IX—IX of Fig. 3, registering with the line IV—IV, and showing further parts.

The machine includes a control mechanism producing simultaneously the rotation of the clamp 12 round its axis 13, the rocking movement of the headstock 11 round its horizontal spindle 15 and the rocking of the headstock round the vertical axis 10. This control mechanism includes a main shaft 17 (Fig. 3, 9 and 10) revolubly carried in the headstock 11 and extending in parallelism with the spindle 15. Said shaft 17 carries a crank 18 which allows its manual operation.

In order to control the rotation of the clamp, the shaft 17 carries a bevel pinion 19 meshing with a second bevel pinion 20 coaxially rigid with a sprocket wheel 21 meshing with a further sprocket wheel 22 coaxially rigid with the clamp. The rotation of the shaft 17 produces thus a rotation of the clamp with a speed reduction such that two revolutions of the crank 18 are required for making the clamp rotate through one revolution. The bevel pinion 19 is driven by the shaft 17 through the agency of a friction clutch illustrated in Fig. 4, which clutch includes a series of three stud pins 23 (Fig. 4) adapted to slide radially in corresponding openings formed in the shaft 17, said studs being urged against the inner surface of a sleeve 19a fitted over the shaft 17 and rigidly carrying the pinion 19, by the conical bearing surface 24a at the end of a centre-punch 24 controlled by a knurled head 25 and screwed at 26 into an axial bore of the shaft 17. The screwing or unscrewing of the head 25 adjusts the friction providing for the drive of the pinion 19 through engagement with said studs 23. It is also possible to completely release said pinion, for instance in the case where it is desired to adjust the angular setting of the drill by rotating the clamp without shifting either the crank 18 or the shaft 17.

Figure 10:
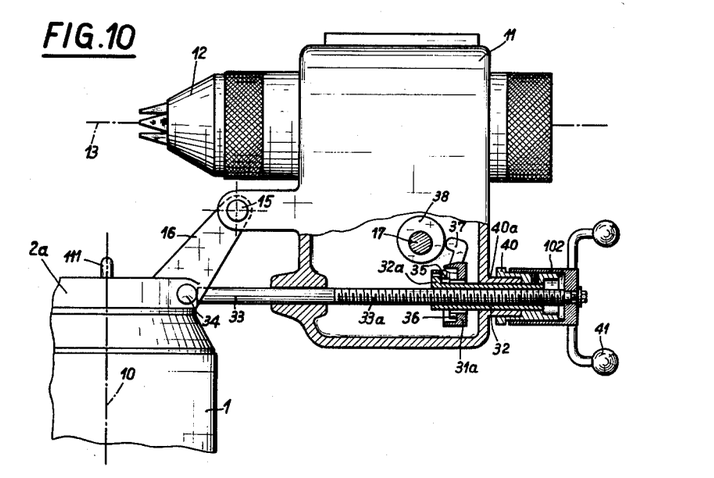
Fig. 10 is an elevational view, partly sectional, of a part of the machine.

The headstock 11 carries also a projecting abutment 27 (Figs. 3, 7 and 8) extending radially with reference to the sprocket wheel 22 controlling the rotation of the clamp. Said projecting abutment carries at its outer end a control head 28 while its inner end terminates with a section having a straight ridge 27a and a further section 27b bounded by a slope 29 perpendicular to said ridge. Said projecting abutment is adapted to slide axially and is subjected to the action of a spring 30 urging its inner end into engagement with the wheel 22. Said abutment may also rock round its axis and occupy three different angular positions in one of which it has its ridge 27a engaging the wheel 22 so as to lock the latter for both directions of rotation, while the section 27b of the abutment cooperates for the two other positions of the latter with the teeth of the wheel 22 and locks said wheel for only one direction of rotation, as defined by the direction assumed by the slope 29, the abutment 27 acting then as a catch. The mechanism producing the rocking movement of the headstock 11 round the spindle 15 carrying it includes a rocking strap 31 (Figs. 3, 9 and 10) adapted to turn round an axis 123 (Fig. 9) passing through the headstock 11 in parallelism with the main shaft 17. Said strap 31 carries a tubular member 32 passing through it with a clearance and screwed over the threaded end 33a of a rod 33 revolubly carried by the headstock 11 in parallelism with the clamp 12, said rod 33 bearing through its other end against a cylindrical abutment 34 (Fig. 10) rigid with the carrier 16 and parallel with the spindle 15 and consequently with the axis 123. The weight of the headstock 11 which urges the latter to rock rearwardly round the spindle 15 constrains the last mentioned end of the rod 33 to engage the abutment 34 as illustrated in Fig. 10. The rod 33 is held against any axial movement towards the rear of the headstock by a stud 32a projecting in parallelism with the rod 33 on the outside of the tubular member 32 and engaging through its terminal projection 35 the inner radially serrated bearing surface 36 of the rocking strap 31. The latter is rigid with an arm 37 the outer end of which engages selectively either of two cams 38 and 39 carried by the main shaft 17. The two cams are mounted on said shaft so as to be capable of moving axially thereon, whereby either of said cams may be brought into register with the arm 37 on the strap 31, according to the work to be executed by the machine. The tubular member 32 carried with a slight swivel by the headstock is rigid with a control sleeve 40 carrying marks adapted to move in front of a stationary reference member 100 carried by the headstock (Fig. 1).

Said sleeve which may be controlled manually allows modifying the angular setting of the stud 32a with reference to the carrier rod 33. In order to move said sleeve 40, it is necessary to raise the headstock by taking hold of it through a handle 101 (Fig. 1) so as to release the projection 35 from the serrations on the bearing surface 36 of the strap 31. In the position of the stud 32a illustrated in Figs. 9 and 10, the projection 35 registers exactly with the axis of rotation 123 of the rocking strap 31. When inoperative and in the position illustrated in Fig. 10, the headstock urges through its weight the strap 31 against the projection 35, the arm 37 on the strap engaging one of the cams 38 or 39 and the rod 33 engaging the stop 34. Assuming now the projection 35 has been shifted into the location illustrated at 35a in dotted lines in Fig. 9, while the cam 38 or 39 has its larger radius section engaging the arm 37 so as to make the strap rock in a clockwise direction as seen in Fig. 10, in such a case and since the projection 35 remains stationary at 35a, the strap has a tendency to move towards the right hand side of Fig. 10, which finally causes a rocking of the headstock round its axis 15 in an anticlockwise direction; the rod 33 follows the headstock during its movement and rocks slightly round the abutment 34 while remaining in contacting relationship with the latter, the difference between the movements executed by the rod and by the headstock being absorbed by the clearance 40a. On the contrary, when a smaller radius section of the cam outline engages the arm 37, the above referred to movements are executed in the opposite directions under the action of the weight of the headstock. These different movements of the cams are produced through the rotation of the main shaft 17 controlled by the crank 18.

Figures 3, 7, 8, 11, 12, 13, 14:
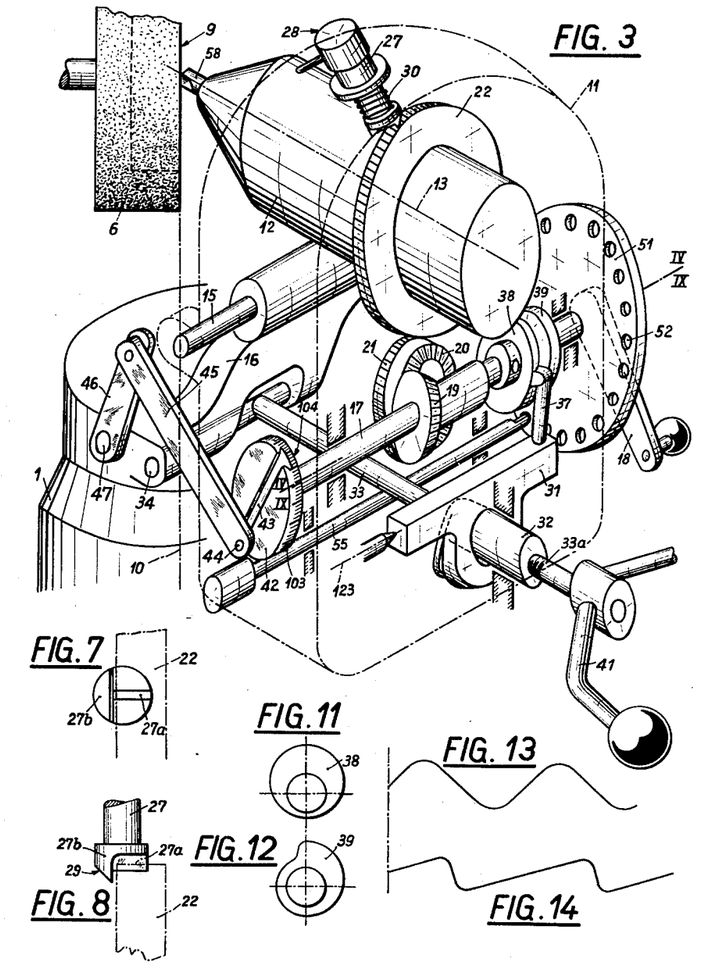
Fig. 3 is a view of a section of the machine, showing only those members which are essential for the execution and understanding of the invention.
Fig. 7 is a plan view from underneath of a control plate shown in Fig. 3.
Fig. 8 is an elevational view of said control plate.
Figs. 11 and 12 are views of two control cams.
Figs. 13 and 14 illustrate respectively the operative developed outlines of said cams.

It should be remarked that when the headstock 11 is inoperative, it is possible to modify its slope by making the rod 33 turn through operation of its control crank 41 (Figs. 3 and 10), which is rigid with a scale-carrying drum 102 rotating in register with the above-mentioned reference member 100 carried by the headstock (Figs. 1 and 3). The rod 33 is thus screwed more or less deeply inside the sleeve 32 and the slope of the headstock i. e. its average position during its rocking movement may thus be modified. This adjustment may be performed even during operation of the crank 18 and it allows producing the feed movement of the drill. During this rotation of the rod 33, the tubular member 32 is held against rotation by the serrations on the bearing surface 36 cooperating with the projection 35 carried by the stud 32a.

The rocking movement of the headstock round the vertical axis 10 is also controlled by the main shaft 17. To this end, said shaft carries at the end opposed to the crank 18 (Figs. 1 and 3), a small plate 42 provided with a diametrical groove 43 in which is adjustably secured a stud or trunnion 44 to which is pivotally secured the end of a link 45. The latter is also pivotally secured through its other end to an arm 46 rigid with a rocking shaft 47 mounted in the carrier 16. Said shaft 47 carries at its other end a projection 48 (Figs. 2 and 3) perpendicular thereto and adapted to engage a stationary adjustable stop 49. For executing the above mentioned rocking movement, the operator turns the crank 18 and therewith the plate 42 through his right hand and, holding in his left hand either of the handles 41 or 101 (Fig. 1), he engages slightly the projection 48 against the stop 49. During one half oscillation of the plate 42, said projection exerts a pressure against said stop and, since the latter is stationary, the turret 2a and carrier 16 will revolve in the opposite direction under the action of the link 45 and of the thrust exerted on the stop 49.

During the following half oscillation of the plate 42, the projection 48 has a tendency to move away from the stop 49 but the operator's left hand holds these parts in contacting relationship while shifting the turret in the opposite direction. The amplitude of the oscillations is adjusted through a modification in the location of the stud 44 inside the groove 43. The rocking movement of the headstock is started after checking on a scale 103 carried by the edge of the plate 42 and cooperating with a stationary reference mark 104 carried by the headstock (Fig. 3).

Lastly, the shaft 17 carries a divider plate 51 (Figs. 2, 3, 4 and 15), said plate being provided with a series of openings 52 in which are removably fitted plugs 53. Each of said plugs is rigid with a projection 53a bounded by a slope 54. These projections extend diametrically only over one half of the plug and cooperate with a catch 55 (Fig. 4) constituted by a rod slidingly engaging the headstock 11 and urged by a spring 56 towards said plugs. The axis of said catch rod is adapted to register in succession with the axes of the openings 52 in the dividing plate 51 and its operative end 55a extends transversely over only one half of said rod 55.

Figures 4, 5, 6:
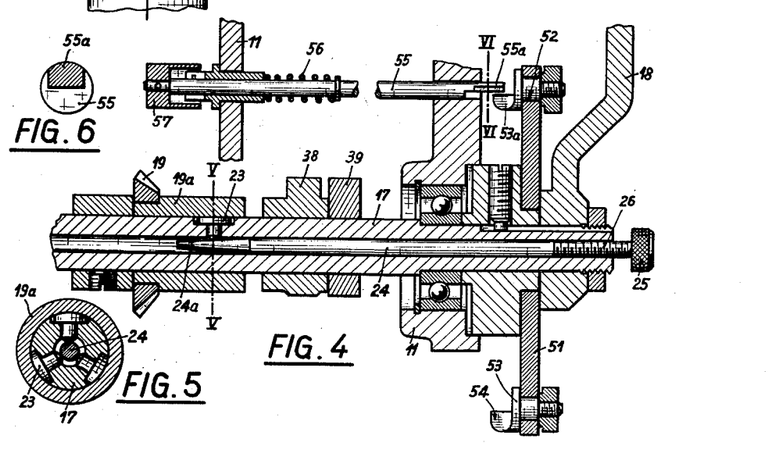
Fig. 4 is a cross-section of a detail through line IV—IV of Fig. 3.
Fig. 5 is a cross-section of a detail through line V—V of Fig. 4.
Fig. 6 is a cross-section of a further detail through line VI—VI of Fig. 4 on an enlarged scale.

A control head 57 (Fig. 4) allows modifying the angular setting of said catch in a manner such that it cooperates either with the plugs 53 of which the projections lie nearer the outside of the plate 51 as in the case of the plug shown at the lower end of Fig. 4 or else with those of the plugs 53, the projections 53a of which are nearer the inside of the plate 51 as illustrated for the plug shown at the upper end of Fig. 4. In practice, these plugs having projections facing opposite directions are not in diametrically opposed relationship. In the position of the catch rod 55 illustrated in Fig. 4, said catch rod cooperates with the plugs having their projections on the outside with reference to the axis of the plate 51. A number of plugs are set so as to prevent the rotation of the plate 51 in one direction and to allow it in the other and others operate in a reverse manner. Some of said plugs may also be of a double type, i. e. be provided with two projections the slopes on which face opposite directions. This arrangement allows defining the angular position of the main shaft 17 and consequently that of the clamp 12 when it is desired to execute for certain sharpening operations rotary movements of the drill by a predetermined angle.

The machine according to my invention shows also the following novel features:

In the first place, the reference rod 14 which, as mentioned at the beginning of the present specification, allows defining the axial and angular positions of the drill, is fitted at the end of a rod 105 (Figs. 1 and 16) and said rod is secured in its turn to a slider 106. The latter moves inside a slideway 107 carried by the headstock 11. The axial position of the rod 105 as controlled by a reference mark 108 carried by the slider 106 and adapted to move in front of a scale of angles 109. The rod 14 is axially movable and is rigid with a control head 110 so that it may be retracted as soon as the accurate location of the drill has been obtained.

Figure 2:
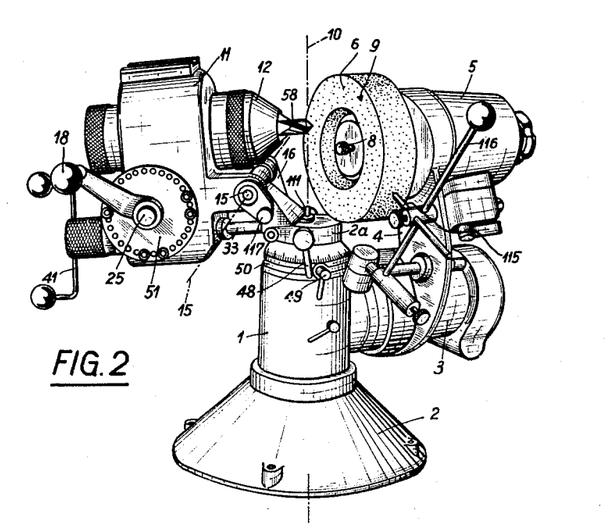
Figures 15, 16, 17, 18:
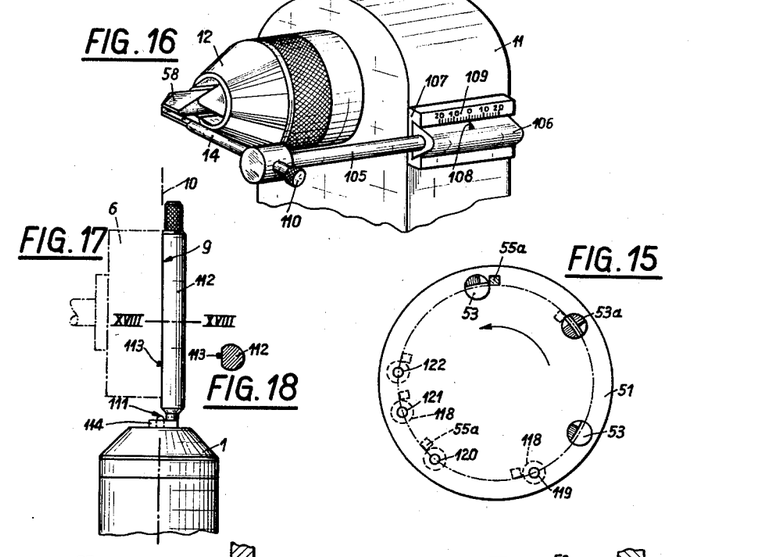
Fig. 15 is an elevational view of a detail of Fig. 4 on a smaller scale.
Fig. 16 is a perspective view of a section of the machine including the headstock.
Fig. 17 is an elevational view of another section of the machine.
Fig. 18 is a cross-section through line XVIII—XVIII of Fig. 17.

The axial location of the grinding wheel being adjustable, a reference rod 112 illustrated in Figs. 17 and 18 allows obtaining an adjustment such as will bring the operative plane 9 of the grinding wheel into registry with the vertical axis 10 of the machine (Figs. 2 and 17). To this end, the turret 2a carries a stud 111 the axis of which is in alignment with said axis 10. The reference rod 112 is provided with a longitudinal flat surface 113 and with a perforated support 114 fitted over the stud 111. In the operative position of the rod 112, the axis 10 lies in the plane of the flat surface 113. It is then sufficient to bring the grinding wheel into contacting relationship with said flat surface for obtaining a correct positioning of its operative surface.

Lastly, the machine is provided with means for truing the grinding wheel, said means including, as shown in Fig. 2, a tool 115 terminating with a diamond tip mounted adjustably on a rod 116 carried in its turn by the support 4 of the grinding wheel.

Figure 19:
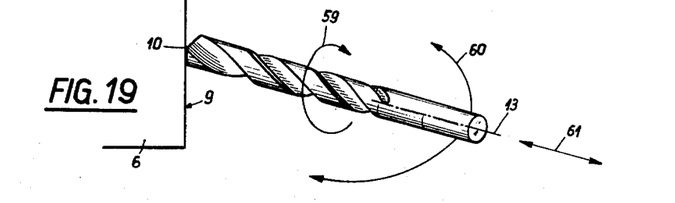
Fig. 19 is a view of a drill with a part of the grinding wheel, illustrating diagrammatically the principle of the operation of the machine.

An example of the grinding procedure according to my invention is illustrated diagrammatically in Fig. 19.

In said example, the drill in contacting relationship with the operative plane 9 of the grinding wheel 6 and the axis 13 of which is held at an angle with reference to said plane executes three movements simultaneously. One of said movements is a rotation round the axis 13 and is illustrated by the arrow 59; the second movement is a rocking movement round the vertical axis 10 located in the plane of the grinding wheel and passing through the tip of the drill, said movement being illustrated by the arrow 60 and being produced by the rocking of the headstock 11 round the axis 10; lastly, the third movement is a reciprocation of the drill as illustrated by the double arrow 61 and as obtained through an oscillatory movement of the headstock round the axis 15 and which may be considered as an axial movement or as a movement with a very slight amplitude.

Figure 20:
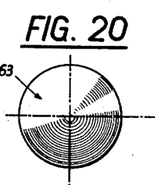
Figs. 20—21, 22—23, and 24—25 are associated plan and elevational views of a solid rod on which are executed in succession respectively the three main sharpening operations although these are in practice executed simultaneously.
Figure 21:
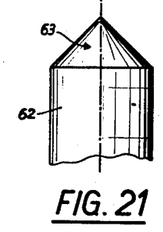
Figure 22:
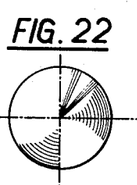
Figure 23:
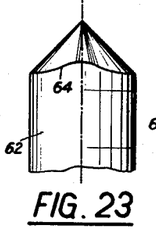

For sake of clarity, I have shown this treble movement of rotation, rocking and reciprocation of the drill as decomposed into its elements in Figs. 20 to 25 which show a solid rod to which said movements are imparted in succession instead of simultaneously as in practice. The rod 62 shown in Figs. 20 and 21 has been subjected to a mere rotation and consequently its end assumes the shape of a symmetrical cone 63. In Figs. 22 and 23, the rod 62, illustrated in Figs. 20 and 21, is subjected to a rocking movement corresponding to the arrow 60 of Fig. 19. This movement modifies in a constant manner the angle at the apex of the cone and consequently the length of the generating line of said cone. For this reason, the base of the cone is irregular and appears at 64 as a curve (Fig. 23).

Figure 24:
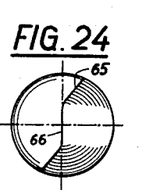
Figure 25:
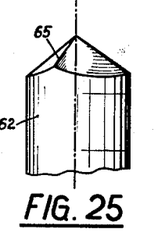
Figure 26:
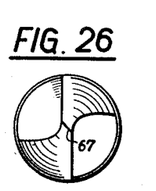
Figs. 26 and 27 are plan and elevational views similar to Figs. 24 and 25 in the case of an actual drill instead of a rod.
Figure 27:
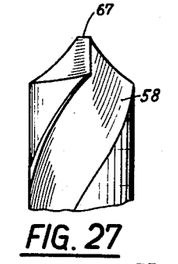

Lastly, in Figs. 24 and 25, the rod 62 is subjected furthermore to a reciprocating substantially axial movement which has for its result a cutting off of the apex. The diagram of said movement controlled by the cam 38 (Fig. 11) is illustrated in Fig. 13. This truncation or cutting off of the apex associated with the two first mentioned movements has for its result the production on the cone of a ridge 65 assuming substantially the shape of an S. The central section of said ridge shown at 66 in Fig. 24 is constituted by a short rectilinear section corresponding to the transverse ridge 67 terminating the shank of the drill provided with two grooves 58 as shown in Figs. 26 and 27. The length of said short ridge 67 varies in accordance with the amplitude of the oscillatory movements of the headstock which amplitude is adjustable as disclosed hereinabove.

Figure 28:
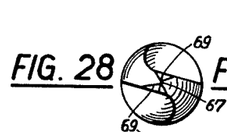
Figs. 28 and 29 are plan and elevational views of a drill the end of which has been formed into a point.
Figure 29:
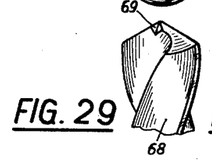

Figs. 28 and 29 show a drill 68 sharpened through the operation of the machine described and in accordance with the above-disclosed method, and provided with two diametrically opposed clearances 69, the part played by which is to cut off the ends of said transverse ridge 67 whereby the drill is pointed, i. e. terminates with a centering point. To produce said clearances 69, the headstock 11 is constrained to rock round the vertical axis 10 until the axis 13 of the clamp is brought into the plane 9 of the grinding wheel. This being done, the slope of the headstock round the axis 15 is adjusted in a manner such that the drill extends tangentially with reference to the outer diameter of the grinding wheel; the angular location of the clamp is then adjusted in a manner such that the ridge of the grinding wheel separating its operative surface 9 from the lateral cylindrical surface 70 (Fig. 1) may engage one of the ends of the transverse ridge 67 of the drill. The headstock and the clamp are then held fast through application of one of the plugs 53 against the catch 55 as provided through a pressure exerted on the crank 18. The handwheel 7 controlling the movements of the grinding wheel is then actuated so as to execute a sinking action producing one of the desired clearances 69. It is then sufficient, after causing the grinding wheel to recede, to make the clamp rock through 180° round its axis and to begin over again the same operation as the opposite end of the transverse ridge 67.

Figure 30:
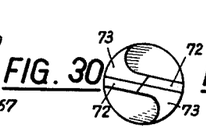
Figs. 30 and 31 are plan and elevational views of a drill sharpened along four surfaces.
Figures 31, 33:
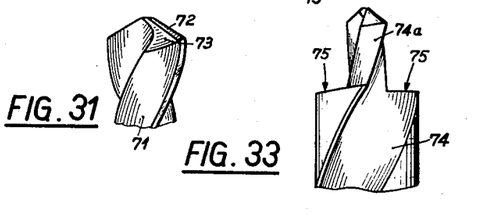
Figs. 32 and 33 are plan and elevational views of a drill including a terminal bit or stud of a reduced diameter.

The machine allows furthermore sharpening drills of the so-called "four-sided" type. Figs. 30 and 31 illustrate a drill 71 which has been ground in such a manner. The tip of the drill is provided with two cutting surfaces 72 and with two backing off surfaces 73. To obtain such a sharpening, the headstock 11 is adjusted so as to enter a predetermined angular position with reference to the axis 10 while it assumes a predetermined slope with reference to the axis 15, after which the angular location of the clamp is adjusted. The plugs 53 are fitted in suitable positions and, one of said plugs being held in contacting relationship with the catch 55 through pressure applied on the crank 18, the handwheel 7 is actuated so as to bring the grinding wheel into contact with the drill. The grinding wheel is caused to continue moving until the whole length of the surface to be ground has been planished and then the grinding wheel is shifted away. The clamp is rotated through actuation of the crank 18 until the next plug 53 has passed beyond the catch 55. A slight receding movement of the crank returns the plug against the catch and the following surface of the drill is planished. During the rotation of the clamp, the headstock has slightly rocked round its axis 10 so as to produce the backing off at 73 of the surface which is being ground. For continuation of the operation, the different parts are returned into the positions suitable for the sharpening of the second cutting surface 72 and finally for the backing off at 73 of said second surface.

Figure 32:
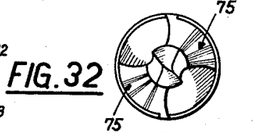

Lastly, my improved machine allows also forming and grinding a drill having a terminal pivot of a reduced size. Figs. 32 and 33 show such a drill 74 terminating with a reduced diameter section 74a. Such a terminal pivot is obtained as follows: the drill being sharpened in accordance with the above-described procedure, the headstock is brought through rotation round the axis 10 into a position for which the axis 13 lies in the operative plane of the grinding wheel. The headstock is shiftable laterally in parallelism with the axis 15 through adjusting means which have not been illustrated except for the control knob 117 illustrated in Fig. 2. The amplitude of said lateral movement corresponds to the radius to be given to the pivot 74a. The cam 39 shown in Fig. 12 and the operative diagram of which is illustrated in Fig. 14 is brought into registry with the lever 37 (Figs. 3 and 9) while the grinding wheel is shifted through the handwheel 7 so as to execute a cutting operation along a direction parallel with the axis of the drill. As a matter of fact, it is possible just as well to shift the headstock laterally through the agency of the above mentioned control knob 117. Simultaneously, the crank 18 is actuated so as to make said cutting operation be executed throughout the periphery of the drill and to form thus the desired cylindrical projecting pivot 74a of reduced diameter. Under the action of the cam 39, the drill executes furthermore a slight reciprocation in the direction of the grinding wheel and consequently the terminal surfaces of the drill body designated by 75 (Figs. 32 and 33) assume a sloping in curved shape.

My improved machine allows also sharpening the cutting edges of taps or of drills with several edges. In such a case, I use the catch 27 which controls the rotation of the clamp in a predetermined direction, the friction clutch allowing an idle return of the crank into its starting position. A stop 118 (Fig. 15) may be fitted in the different openings 119, 120, 121, 122 selectively of the plate 51 according as to whether the division is to be performed for three, four, five or six cutting edges respectively. The stop 118 extends over one half of the diameter of the opening carrying it after the manner of the plugs 53, but it differs from the latter inasmuch as it is not provided with a sloping plane as it does not ride over the catch 55 but only stops in contact with the latter.

My improved machine also allows grinding cutters or drills of the multiple radius type.

Obviously, my invention is by no means limited to the machine illustrated as it is possible in fact to replace the rocking arrangement for the headstock by a sliding arrangement producing a reciprocation of the clamp in a perfectly axial direction.

What I claim is:

1. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is adapted to reciprocate over the carrier substantially along the axis of the drill to shift the latter towards and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

2. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a control mechanism associating the rotary movement of the drill inside the headstock with the first mentioned rocking movement of the headstock and carrier, means operatively interconnecting the rocking and pivoting movements of the headstock, and means for adjusting the amplitudes and starting points of the rocking and pivoting movements of the headstock.

3. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is slidingly carried by its carrier to allow the headstock to move in substantial parallelism with the axis of the drill to shift the latter towards and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

4. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a control mechanism associating the rotary movement of the drill inside the headstock with the first mentioned rocking movement of the headstock and carrier, means operatively interconnecting the rocking and pivoting movements of the headstock, and adjusting means adapted to provide at least one of the following adjustments: an adjustment of the position of the headstock at the beginning of operation with reference to the axis perpendicular to last mentioned plane and independently of the rocking movement of the headstock and an adjustment of the mean position of the headstock during its pivoting movement.

5. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carried by the headstock and adapted to control its pivoting and rocking movements and the rotation of the drill, and means for adjusting the amplitudes and starting points of the rocking and reciprocating movements of the headstock.

6. A machine for sharpened through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carried by the headstock and adapted to control its pivoting and rocking movements, a friction clutch controlled by last mentioned mechanism and controlling the rotation of the drill, and means for adjusting the amplitudes and starting points of the rocking and reciprocating movements of the headstock.

7. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a mamnner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carried by the headstock and adapted to control its pivoting and rocking movements, said mechanism including a mainshaft, a friction clutch carried by said shaft and a pinion revolubly carried by the mainshaft and adapted to be controlled by the latter through the friction clutch, means wherethrough said pinion controls the rotation of the drill, and means for adjusting the amplitudes and starting points of the rocking and reciprocating movements of the headstock.

8. A machine for sharpening through grinding drills and the like tools, comprising a frame, a carrier adapted to rock over the frame round a first axis, a clamp revolvably carried by the headstock and adapted to rigidly and coaxially carry a drill to rotate therewith round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carried by the headstock and adapted to control its pivoting and rocking movements, said mechanism including a mainshaft, a friction clutch carried by said shaft and a pinion revolubly carried by the mainshaft and adapted to be controlled by the latter through the friction clutch, a toothed wheel coaxially rigid with the clamp and controlled by said pinion, a projection on the headstock extending radially with reference to said wheel, slidingly movable along its axis with reference to the headstock into and out of engagement with the wheel and adapted to revolve round its axis to enter selectively three angular positions, said projection terminating at its end facing the toothed wheel with a straight edge adapted when engaging the toothed wheel for one of the three angular positions of the projection to lock the wheel against rotation, and with a bevel section adapted to engage the toothed wheel for either of the two other angular positions of the projection to hold the latter selectively against rotation in one of both directions for said last mentioned positions, and means urging elastically the projection into engagement with the toothed wheel.

9. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a control mechanism controlling the rotary movement of the drill inside the headstock and the rocking and pivoting movements of the headstock, a rod extending through the headstock perpendicularly to its pivoting axis, a stop rigid with the headstock carrier against which said rod abuts through one end, a movable stop carried by said rod, and means carried by the headstock to engage said stop and define the mean position of the headstock during its pivoting movements.

10. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the support to shift the drill reciprocatingly toward and away from the grinding wheel, a control mechanism controlling the rotary movement of the drill inside the headstock and the rocking and pivoting movements of the headstock, a rod extending through the headstock perpendicularly to its pivoting axis, a stop rigid with the headstock carrier against which said rod abuts through one end, a movable stop carried by said rod, means for adjusting the position of the stop longitudinally of the rod, and means carried by the headstock to engage said stop and define the mean position of the headstock during its pivoting movements.

11. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a control mechanism adapted to produce the rotary movement of the drill inside the headstock and the rocking movement of the headstock, a rod extending through the headstock perpendicularly to its pivoting axis, a stop rigid with the headstock carried against which said rod abuts through one end, a stop on said rod including a projection perpendicular to the axis of the rod and angularly adjustable with reference to the axis of the rod, a member rockably carried by the headstock to rock round an axis perpendicular to the axis of the rod in the vicinity of the path of said adjustable stop and parallel with the pivotal axis of the headstock, means wherethrough the control mechanism controls the rocking member to produce through engagement thereof with the projection on the rod a relative shifting between the headstock and the rod and therethrough a pivoting movement of the headstock the amplitude of which pivoting movement is defined by the angular location of the stop with reference to the rod.

12. A machine for sharpening through grinding drill and the like tools, comprising a frame, a carrier adapted to rock over the frame round a first axis, a headstock on said carrier adapted to carry a drill revolvably around its axis, the drill axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the support to shift the drill reciprocatingly towards and away from the grinding wheel, a control mechanism controlling the rotary movement of the drill inside the headstock and the rocking movement of the headstock, a rod extending through the headstock perpendicularly to its pivoting axis, a stop rigid with the headstock carrier against which said rod abuts through one end, a stop on said rod including a projection perpendicular to the axis of the rod and angularly adjustable with reference to the axis of the rod, a member rockably carried by the headstock to rock round an axis perpendicular to the axis of the rod registering with the projection on the stop on the rod for a predetermined angular position of said stop with reference to the rod and parallel with the pivotal axis of the headstock, means wherethrough the control mechanism controls the rocking member to produce through engagement thereof with the projection on the stop a relative shifting between the headstock and the rod and wherethrough a pivotal movement of the headstock the amplitude of which pivotal movement is defined by the angular location of the stop with reference to the rod, the oscillations of the rocking member producing then no relative shifting between the headstock and the rod and consequently no pivoting of the headstock for said predetermined angular position of the stop on the rod.

13. A machine for sharpening through grinding drills and the like tools, comprising a frame, a carrier adapted to rock over the frame round a first axis, a headstock on said carrier adapted to carry a drill revolvably round its axis, the drill axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carried by the headstock and including a mainshaft, a friction clutch carried by said shaft and a pinion revolubly carried by the mainshaft and adapted to be controlled by the latter through the friction clutch, means wherethrough said pinion controls the rotation of the drill, a rod extending through the headstock perpendicularly to its axis, a stop rigid with the headstock carrier against which said rod abuts through one end, a stop on said rod including a projection perpendicular to the axis of the rod and angularly adjustable with reference to the axis of the rod, a member rockably carried by the headstock to rock round an axis perpendicular to the axis of the rod, registering with the projection on the stop on the rod for a predetermined angular position of said stop with references to the rod and parallel with the pivotal axis of the headstock, at least, one cam rigid with the mainshaft, a lever rigid with the rocking member operatively engaging the cam and adapted to produce under the action of said cam a rocking of said rocking member to produce through engagement thereof with the projection on the stop a relative shifting between the rod and the headstock and wherethrough a pivotal movement of the headstock the amplitude of which pivotal movement is defined by the angular location of the stop with reference to the rod, the oscillations of the rocking member producing then no relative shifting between of the headstock and the rod and consequently no rocking of the headstock for said predetermined angular position of the stop on the rod, and means wherethrough the mainshaft controls the pivotal movement of the headstock.

14. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel, and the drill are mounted on the carrier in a manner such as will make the flat operative plane of the grinding wheel contain the first mentioned axis with the tip of the drill engaging said operative flat surface, means whereby the headstock is pivotally secured to the carrier round as axis perpendicular to the plane constituted by the axis of the drill and by the first mentioned rocking axis of the carrier to shift the drill reciprocatingly towards and away from the grinding wheel, a mechanism carried by the headstock and including a mainshaft, a friction clutch carried by said shaft and a pinion revolubly carried by the mainshaft and adapted to be controlled by the latter through the friction clutch, means wherethrough said pinion controls the rotation of the drill, a rod extending through the headstock perpendicularly to its pivoting axis, a stop rigid with the headstock carrier against which said rod abuts through one end, a stop on said rod including a projection perpendicular to the axis of the rod and angularly adjustable with reference to the axis of the rod, a member rockably carried by the headstock to rock round an axis perpendicular to the axis of the rod registering with the projection on the stop on the rod for a predetermined angular position of said stop with references to the rod and parallel with the pivotal axis of the headstock, two cams having different outlines axially shiftable with reference to said mainshaft and adapted to enter selectively a predetermined position, a lever rigid with the rocking member and adapted to engage the cam which has entered its operative position to produce under the action of said cam a rocking of said rocking member, to produce through engagement thereof with the projection on the stop a relative shifting between the rod and the headstock and wherethrough a pivotal movement of the headstock the amplitude of which pivotal movement is defined by the angular location of the stop with reference to the rod, the oscillations of the rocking member producing then no relative shifting between the headstock and the rod and consequently no rocking of the headstock for said predetermined angular position of the stop on the rod, and means wherethrough the mainshaft controls the pivotal movement of the headstock.

15. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a stubshaft pivotally carried by the carrier round an axis perpendicular to last mentioned plane, a short lever rigid with and perpendicular to said stubshaft on the outside of the carrier, a stationary stop rigid with the frame of the machine and engageable by the short lever, a mechanism carried by the headstock and controlling the rotation of the stubshaft to make the latter upon engagement with the stationary stop urge the carrier into a rocking movement round the first mentioned axis, means whereby said mechanism also controls the pivotal movement of the headstock with reference to the carrier and the rotation of the drill, and means for adjusting the amplitudes and the starting points of the rocking and pivotal movements of the said shaft.

16. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a stubshaft pivotally carried by the carrier round an axis perpendicular to last mentioned plane, a short lever rigid with and perpendicular to said stubshaft on the outside of the carrier, a stationary stop rigid with the frame of the machine and engageable by the short lever, a mechanism carried by the headstock and including a rotary mainshaft parallel with the stubshaft, a connecting rod pivotally secured at one end eccentrically to the mainshaft, a link the ends of which are pivotally connected with the other end of the connecting rod and with the stubshaft, means controlling the rotation of the mainshaft to make the stubshaft upon engagement with the stationary stop urge the carrier into a rocking movement round the first mentioned axis, means whereby said mainshaft also controls the pivotal movement of the headstock with reference to the carrier and the rotation of the drill, and means for adjusting the amplitudes and the starting points of the rocking and pivotal movements of the said shaft.

17. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a stubshaft pivotally carried by the carrier round an axis perpendicular to last mentioned plane, a short lever rigid with and perpendicular to said stubshaft on the outside of the carrier, a stationary stop rigid with the frame of the machine and engageable by the short lever, a mechanism carried by the headstock and including a rotary mainshaft parallel with the stubshaft, a connecting rod pivotally secured at one end eccentrically to the mainshaft, a link the ends of which are pivotally connected with the other end of the connecting rod and with the stubshaft, means controlling the rotation of the mainshaft to make the stubshaft upon engagement with the stationary stop urge the carrier into a rocking movement round the first mentioned axis, means for adjusting the eccentricity of the connection between the connecting rod and the mainshaft between zero and a predetermined maximum value and wherethrough the amplitude of the oscillations of the headstock, means whereby said mainshaft also controls the pivotal movement of the headstock with reference to the carrier and the rotation of the drill, and means for adjusting the amplitudes and the starting points of the rocking and pivotal movements of the said shaft.

18. A machine for sharpening through grinding drills and the like tools, comprising a frame, a carrier adapted to rock over the frame round a first axis, a clamp revolvably carried by the headstock and adapted to rigidly and coaxially carry a drill to rotate therewith round the drill axis, said axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round said axis perpendicular to the plane constituted by the axis of the drill and by the first mentioned rocking axis of the carrier to shift the drill reciprocatingly towards and away from the grinding wheel, a mechanism carried by the headstock and adapted to control its pivoting and rocking movements, said mechanism including a mainshaft, a friction clutch carried by said shaft and a pinion revolubly carried by the mainshaft and adapted to be controlled by the latter through the friction clutch, a toothed wheel coaxially rigid with the clamp and controlled by said pinion, a projection on the headstock extending radially with reference to said wheel, slidingly movable along its axis with reference to the headstock into and out of engagement with the wheel and adapted to revolve round its axis to enter selectively three angular positions, said projection terminating at its end facing the toothed wheel with a straight edge adapted when engaging the toothed wheel for one of the three angular positions of the projection to lock the wheel against rotation, and with a bevel section adapted to engage the toothed wheel for either of the two other angular positions of the projection to hold the latter selectively against rotation in one of both directions for said last mentioned positions, means urging elastically the projection into engagement with the toothed wheel, a dividing plate coaxially rigid with the mainshaft, plugs removably carried by said plate at different points of its periphery, a catch carried by the headstock and adapted to engage said plugs selectively to prevent the rotation of the mainshaft in one direction, the plugs being shaped and positioned to stop the movement of the mainshaft in a predetermined direction between predetermined angular positions and wherethrough to constrain the clamp and drill to be rotated intermittently through the clutch for one of said directions selectively the mainshaft being returned into its starting position between said intermittent rotations.

19. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, a support for the grinding wheel rockably mounted on the frame round an axis parallel with the axis of the grinding wheel and perpendicular to the first mentioned axis, means wherethrough the grinding wheel and the drill are mounted on the carrier in a manner such as will make the flat operative plane of the grinding wheel contain the first mentioned axis with the tip of the drill engaging said operative flat surface, means whereby the headstock is adapted to reciprocate over the carrier substantially along the axis of the drill to shift the latter towards and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

20. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, a support for the grinding wheel rockably mounted on the frame round an axis parallel with the axis of the grinding wheel and perpendicular to the first mentioned axis, hand operable means for adjusting the angular setting of the support of the grinding wheel with reference to the frame of the machine, means wherethrough the grinding wheel and the drill are mounted on the carrier in a manner such as will make the flat operative plane of the grinding wheel contain the first mentioned axis with the tip of the drill engaging said operative flat surface, means whereby the headstock is adapted to reciprocate over the carrier substantially along the axis of the drill to shift the latter towards and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

21. A machine for sharpening through grinding drills and the like tools, comprising a frame, a carrier adapted to rock over the frame round a first axis, a headstock on said carrier adapted to carry a drill revolvably round its axis, said axis crossing the first mentioned axis, a grinding wheel, the axis of which is perpendicular to the first mentioned axis, means for adjusting axially the position of the grinding wheel to make the flat operative plane of the grinding wheel contain the first mentioned axis with the tip of the drill engaging said operative flat surface, means whereby the headstock is adapted to reciprocate over the carrier substantially along the axis of the drill to shift the latter towards, and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

22. A machine for sharpening through grinding drills and the like tools, comprising a frame, a carrier adapted to rock over the frame round a first axis, a headstock on said carrier and adapted to revolubly carry a drill round its axis, said axis crossing the first mentioned axis, a grinding wheel, the axis of which is perpendicular to the first mentioned axis, a removable reference rod adapted to be fitted on the frame of the machine so as to define the first mentioned axis round which the headstock and its carrier are rockably mounted and with which the flat operative surface of grinding wheel is to register, means for adjusting axially the position of the grinding wheel to make the flat operative plane of the grinding wheel contain the first mentioned axis with the tip of the drill engaging said operative flat surface, means whereby the headstock is adapted to reciprocate over the carrier substantially along the axis of the drill to shift the latter towards and away from the grinding wheel, a control mechanism associating the rotary movement of the drill inside the headstock with the first mentioned rocking movement of the headstock and carrier, means operatively interconnecting the rocking and reciprocating movements of the headstock, and means for adjusting the amplitudes and starting points of the rocking and reciprocating movements of the headstock.

23. A machine for sharpening through grinding drills and the like tools, comprising a frame, a carrier adapted to rock over the frame round a first axis, a headstock on said carrier and adapted to revolubly carry a drill round its axis, said axis crossing the first mentioned axis, a reference rule adapted to adjust the axial and angular positions of the drill in the headstock, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is adapted to reciprocate over the carrier substantially along the axis of the drill to shift the latter towards and away from the grinding wheel, a control mechanism associating the rotary movement of the drill inside the headstock and carrier means operatively interconnecting the rocking and reciprocating movements of the headstock, and means for adjusting the amplitudes and starting points of the rocking and reciprocating movements of the headstock.

24. A machine for sharpening through grinding drills and the like tools, comprising a frame, a carrier adapted to rock over the frame round a first axis, a headstock on said carrier, adapted to revolubly carry a drill, the drill axis crossing the first mentioned axis, a grinding wheel, means wherethrough the grinding wheel and the drill are mounted on the carrier in a manner such as will make the flat operative plane of the grinding wheel contain the first mentioned axis with the tip of the drill engaging said operative flat surface, means whereby the headstock is pivotally secured to the carrier round an axis perpendicular to the plane constituted by the axis of the drill and by the first mentioned rocking axis of the carrier to shift the drill reciprocatingly towards and away from the grinding wheel, a mechanism carrier by the headstock and adapted to control its pivoting and rocking movements and the rotation of the drill and means for adjusting the position of the headstock longitudinally of its pivotal axis.

References Cited in the file of this patent

UNITED STATES PATENTS

| | | |
|---|---|---|
| 777,247 | Dahl | Dec. 13, 1904 |
| 1,379,853 | Cogsdill | May 31, 1921 |
| 1,582,014 | Kendall | Apr. 20, 1926 |
| 1,669,887 | Wildhaber | May 15, 1928 |
| 1,714,136 | Probert et al. | May 21, 1929 |